Jan. 13, 1953            L. C. NOSCO            2,625,076

DOUBLE BEAM ATTACHMENT FOR CONTOUR PROJECTORS

Filed April 2, 1951            2 SHEETS—SHEET 1

LOUIS C. NOSCO
INVENTOR.

BY *Daniel I. Mayne,*
*F. M. Emerson Holmes*
ATTORNEYS

Jan. 13, 1953 L. C. NOSCO 2,625,076
DOUBLE BEAM ATTACHMENT FOR CONTOUR PROJECTORS
Filed April 2, 1951 2 SHEETS—SHEET 2
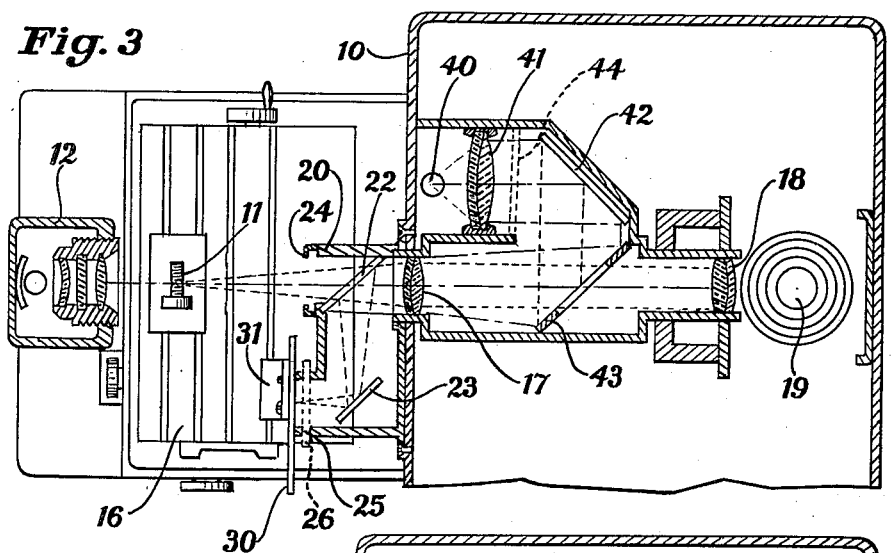
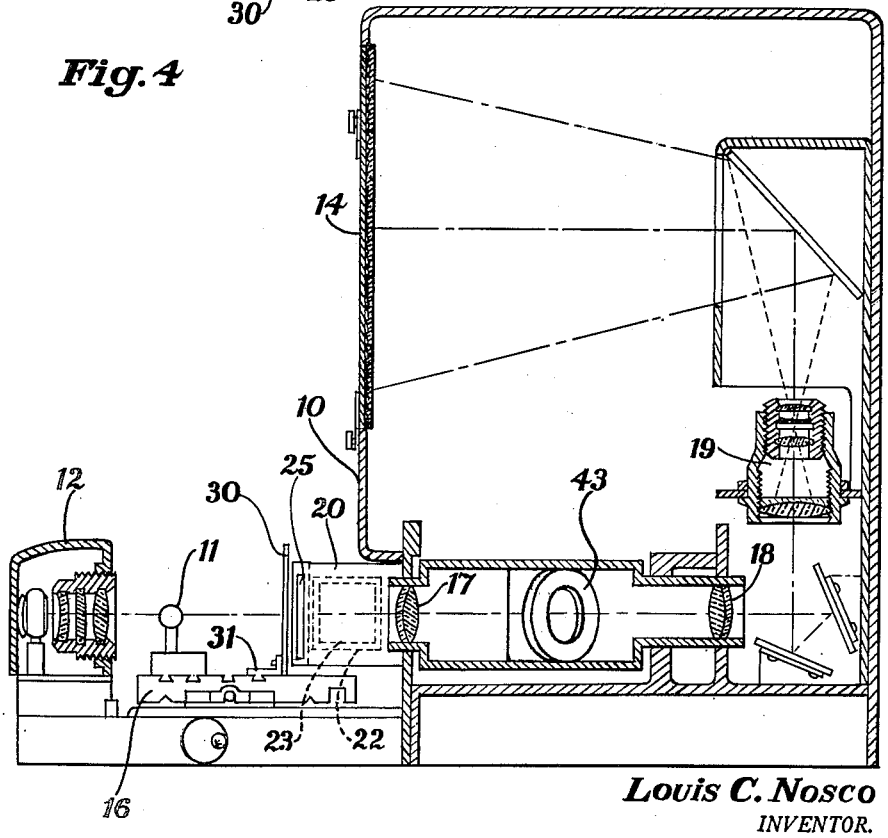
Louis C. Nosco
INVENTOR.
BY Daniel I. Mayne
F. M. Emerson Holmes
ATTORNEYS Patented Jan. 13, 1953

2,625,076

UNITED STATES PATENT OFFICE 2,625,076

DOUBLE BEAM ATTACHMENT FOR CONTOUR PROJECTORS

Louis C. Nosco, Rochester, N. Y., assignor to Eastman Kodak Company, Rochester, N. Y., a corporation of New Jersey Application April 2, 1951, Serial No. 218,878

4 Claims. (Cl. 88—24)

This invention relates to contour projectors such as used in the manufacture of machine tools.

In general contour projectors consist of an optical system for projecting a greatly enlarged silhouette of an object onto a screen on which is mounted a chart for comparison with the silhouette. Certain types of projectors which may be referred to as double beam projectors use a small chart and project an image of it onto the screen simultaneously with and superimposed on the image of the object being examined. One advantage of double beam projectors is the fact that the chart may be quite small.

An object of the present invention is to provide a double beam projector which employs a chart the same size as the object itself and in which the chart and object can be moved simultaneously across the projection beams so that the object and chart may be very large compared to the optical field of the projection system. That is, the instrument may be used for the examination of a large object, at high magnification, but only part of the large object is examined at any one time. This is quite important in a practical sense since if one wishes to examine an object one foot long at a magnification of 100, a single beam projector would require a viewing screen and chart 100 feet in diameter. The present invention would merely require a chart one foot long and would confine the examination at any one moment to a section of the object $\frac{1}{10}$ inch long if the screen is 10 inches wide. This is obviously a thoroughly practical way to examine an object at a magnification of 100.

It is also a primary object of the invention to provide a contour projector of the double beam type merely by providing a simple attachment for a standard single beam contour projector. The present invention requires the standard projector to be one such as described in Patent Application 64,406 by Robert J. Hudak, filed December 9, 1948, now Patent No. 2,552,280, in which an episcopic illuminating system is provided which directs light back through the first lens of the objective system of the projector, toward the object.

According to the invention this episcopic illuminating system is employed for illuminating the chart while the object itself is illuminated either episcopically or diascopically (in silhouette).

According to the invention a double beam comparison attachment is provided to be mounted optically ahead of the first lens of the image-forming system of a contour projector having an adjustable worktable of the usual type and having the episcopic illuminating feature discussed above. The attachment consists essentially of a semitransparent or partially transparent mirror mounted obliquely to the light beam to transmit light from the object to the objective system and to reflect at least part of the episcopic light coming from the objective system to one side, where it is picked up by a plane mirror mounted parallel to the semitransparent mirror and reflected parallel to the optical axis of the contour projector lens system, to a reflecting chart mounted on the worktable to move with the object itself. Thus, as the object is moved transversely across the optical field of the projector, the chart is simultaneously moved the same amount across the light beam incident thereon. The chart and object are mounted optically at the same distance from the first lens of the objective system so that they are simultaneously in focus. The reflecting chart may be highly reflecting or merely a diffuse surface such as paper, although paper itself is not usually used because of the fact that the chart must have stable dimensions. The light reflected from the chart is reflected in turn by the second (plane) mirror and the semitransparent mirror back into alignment with the light from the object so that the two beams are simultaneously projected at the same magnification onto the viewing screen of the instrument.

Preferably the semitransparent mirror is dichroic so that the light beams from the object and chart are differently colored. Ordinary color filter complementary to the color transmitted by instead of using a dichroic reflector or along with the dichroic reflector to get enhanced effects. For example, if it is desirable to prevent any episcopic illumination of the object, a color filter complimentary to the color transmitted by the dichroic reflector may be mounted in front of the light source of the episcopic illuminating system. Thus, light from this source will be reflected to and from the chart but will not appreciably illuminate the object episcopically. Contrariwise, it is possible to illuminate both the object and the chart episcopically and in different colors simply by using a dichroic semitransparent reflector. As an example of one special feature of the invention, it is noted that a shadow of the object in red light overlapping the shadow from a reticle in green light appears black whereas areas of overlapping light appear white. Thus, there may be areas of white, red, green, and black which provides high sensitivity in checking tolerances of a test object.

The simple attachment according to the present invention enables a standard projector to perform comparative-type inspection of work of such size as to be beyond the normal range of the projector. An incidental advantage arising out of the simple arrangement of a reflector chart using the episcopic illumination built into the projector itself, is the fact that the attachment and the chart are both well forward on the worktable so that practically all of the worktable is left to accommodate large work pieces. While the reduction in over-all illumination at the screen due to the semitransparent mirror is a factor which must be considered, there is always an excess of illumination except at the highest magnifications, in which case greater illumination may be obtained by using higher wattage lamps. The present invention may be used up to any magnification available optically, which is not beyond the precision or trueness of the worktable travel.

The advantages of the invention and the operation thereof will be fully understood from the following description when read in connection with the accompanying drawings, in which:

Figs. 3 and 4 are sections in plan and in elavation of the instrument shown in Fig. 1.

Figure 1:
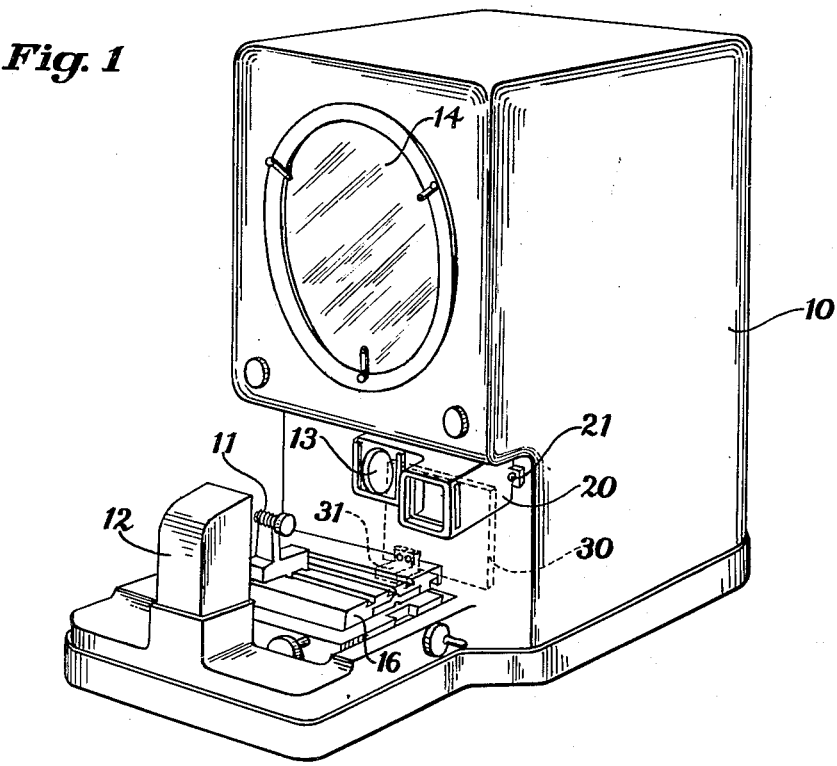
Fig. 1 is a perspective view of a contour projector incorporating the present invention.

In Fig. 1 a contour projector 10 for the examination of an object 11 is provided with a light source 12 for diascopic or back illumination of the object. A silhouette of the object is produced by a light beam from the source 12 passing through an opening 13 to the objective system of the projector and focused on a view screen 14. The object 11 is mounted for transverse, longitudinal and vertical motion on a worktable 16. The attachment according to the invention is shown at 20 and is attached to the projector 10 by screws 21. A reflecting chart shown by broken lines 30 is also attached to the worktable 16 by a mount 31.

Figure 2:
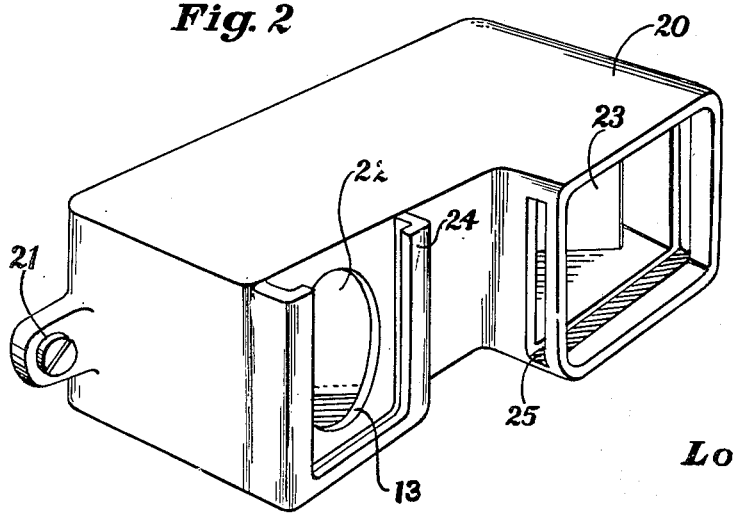
Fig. 2 is a perspective view, on a larger scale than Fig. 1, of an attachment according to the present invention for a standard contour projector.

As shown in Fig. 2 the attachment 20 includes a semi-transparent mirror 22 seen through the front opening 13 in the attachment and a plane mirror 23 seen through the auxiliary opening in the attachment. Frames 24 and 25 are provided to permit the insertion of color filters in the main object beam and the auxiliary chart beam respectively.

The operation of the device will be more clearly understood from Figs. 3 and 4. The objective system of the contour projector in this case is made up of a first telecentric afocal system consisting of lenses 17 and 18 separated by the sum of their focal lengths with the effective stop of the system at the mutual focal plane between the lenses. Light from the object 11 is focused by lenses 17 and 18 to form an aerial image which is relayed at high magnification by an objective 19 to form a greatly enlarged image on the screen 14 which consists of a diffusing surface and a Fresnel field lens. The object 11 is diascopically illuminated by the light source 12 or alternately is episcopically illuminated by a light source 40, through a condenser lens 41, a mirror 42, and a ring-shaped mirror 43 surrounding and constituting the aperture stop of the telecentric lens system discussed above. The ring mirror 43 reflects the light "backwards" through the lens 17. In a simple contour projector, without the present invention, this light is used solely for the episcopic illumination of the object 11. However, the attachment 20 according to the present invention, includes a semitransparent mirror 22 which reflects part of this light to the mirror 23 and thence to the reflecting chart 30. The optical distance from the object 11 to the lens 17 is the same as the optical distance from the chart 30 to the lens 17. The optical field or area of the object 11 which is projected to the screen 14 depends on the power of the lens 19. At very high magnification, only a small area of the object 11 is within the optical field. However, the object 11 and the chart 30 can be moved transversely and simultaneously by the adjusting mechanisms provided on the worktable 16. The chart 30 is at unit scale with respect to the object 11 and as the two are moved across the respective light beams, corresponding parts of both appear on the screen 14 for direct comparison. The only limit on the width of the chart 30 is such that it does not extend into the light beam from the object 11 at any time during its useful travel.

If similarly colored filters, say red filters, are placed at 26 and 44 (as shown by broken lines) and a complementary color filter, say blue, is placed in the filter holder 24, none of the episcopic light from the source 40 reaches the object 11 and on the screen the diascopic light from the source 12 will appear blue whereas light from the chart 30 will appear red to permit quick comparisons. The filter 26 is of course not essential. The same contrast of images can be obtained without any of the three filters, merely by using a dichroic semitransparent reflector at 22. For example, if the semitransparent mirror 22 reflects yellow and transmits blue, the image of the object will appear blue and the image of the chart will appear yellow. This is true whether the object 11 is episcopically or diascopically illuminated. If one wishes, in this system, to use only the diascopic illumination from the lens 12, a yellow filter at 44 will prevent episcopic illumination reaching the object 11 through a dichroic filter 22 which transmits only blue light and reflects the yellow.

The reticle or chart 30 may be simply black lines on a white diffusing surface mounted on glass or metal but is preferably made more reflecting than that simply by placing the reticle marks on a mirror. The important point is to have the reticle in accurate focus and it may be the front surface of an ordinary rear-surfaced mirror. The reticle may be made on a separate piece of glass and placed against a mirror surface or against the front surface of an ordinary rear-surfaced mirror.

Pellicle type semireflecting surfaces may be used at 22 or this surface may be in any of the usual forms such as between two prisms, but a plate glass with semitransparent aluminum coating or a dichroic reflector has proven satisfactory in the simple form shown.

Having thus described the preferred embodiments of my invention, I wish to point out that it is not limited thereto but is of the scope of the appended claims.

I claim:

1. A double beam optical comparison attachment adapted to be mounted ahead of the first lens of the image-forming system of a contour projector having a worktable for supporting an object and for moving it transversely across the field of the image-forming system and also having means for illuminating the object from behind for silhouette projection and means for illuminating the object episcopically through said first lens, which attachment comprises a mount for supporting the attachment ahead of said first lens, a semitransparent mirror carried by the mount aligned with, and oblique to, the axis of said lens, a second mirror also carried by the mount parallel to said semi-transparent mirror to receive episcopic illuminating light from the lens as reflected by said semitransparent mirror and to reflect it parallel to said lens axis, and means on said worktable for supporting a flat reflecting chart to receive said light optically at the front focus of said image-forming system and orthogonal to the optical axis of the lens to reflect the light back to the second mirror, and thence to the semitransparent mirror and thence into said first lens in alignment with light transmitted by said semitransparent mirror from the silhouette-illuminating means, whereby transverse movement of the worktable moves both the object and the chart identical distances transversely across the field of the image-forming system.

2. An attachment according to claim 1 in which said semitransparent mirror is dichroic, reflecting one color and transmitting a different color.

3. An optical system for a contour projector comprising a transversely adjustable worktable for supporting an object and a chart for mutual comparison, means for transilluminating the object, an objective lens system for receiving light from the silhouette of the object and for forming an image thereof on a screen, means for episcopically illuminating the object through the first lens of said objective system, semitransparent reflecting means, means for supporting the semitransparent reflecting means between the object and said first lens and oblique to the optical axis of said lens, a plane mirror, means for supporting the plane mirror parallel to the semitransparent reflecting means and aligned to receive light from the episcopic illuminating means and semitransparent reflecting means and to reflect it parallel to said optical axis and to said chart which reflects it back to the plane mirror thence to the semitransparent reflecting means, thence into alignment with the light from the object to said lens, the reflecting chart and the object being at optically equivalent distances from the objective system, whereby transverse movement of the worktable moves both the object and the chart identical distances transversely across the field of the image-forming system.

4. A contour projector comprising a worktable for supporting an object and a chart for mutual comparison said chart being a flat reflecting chart, means for transilluminating the object, a screen, an objective system for receiving light from the object and for forming an image thereof on the screen, a semitransparent mirror obliquely across the beam of light from the object to the first lens of the objective system, means for sending episcopic illuminating light backwards through said first lens to said semitransparent mirror, a second mirror parallel to the semitransparent mirror for receiving episcopic light reflected by the semitransparent mirror and for reflecting it to said chart orthogonal to said light and at an optical distance from said first lens equal to the optical distance of the object from said first lens, said worktable being adjustable for simultaneously moving the object and chart identical distances transversely across the light beams going to the objective system respectively from the object and chart.

LOUIS C. NOSCO.

REFERENCES CITED

The following references are of record in the file of this patent:

UNITED STATES PATENTS

| Number | Name | Date |
|---|---|---|
| 2,155,248 | Adams | Apr. 18, 1939 |